March 16, 1937.  R. C. BLACKMAN  2,074,011
AUTOMOBILE DIRECTION SWITCH AND SIGNAL
Filed Jan. 30, 1933  2 Sheets-Sheet 1
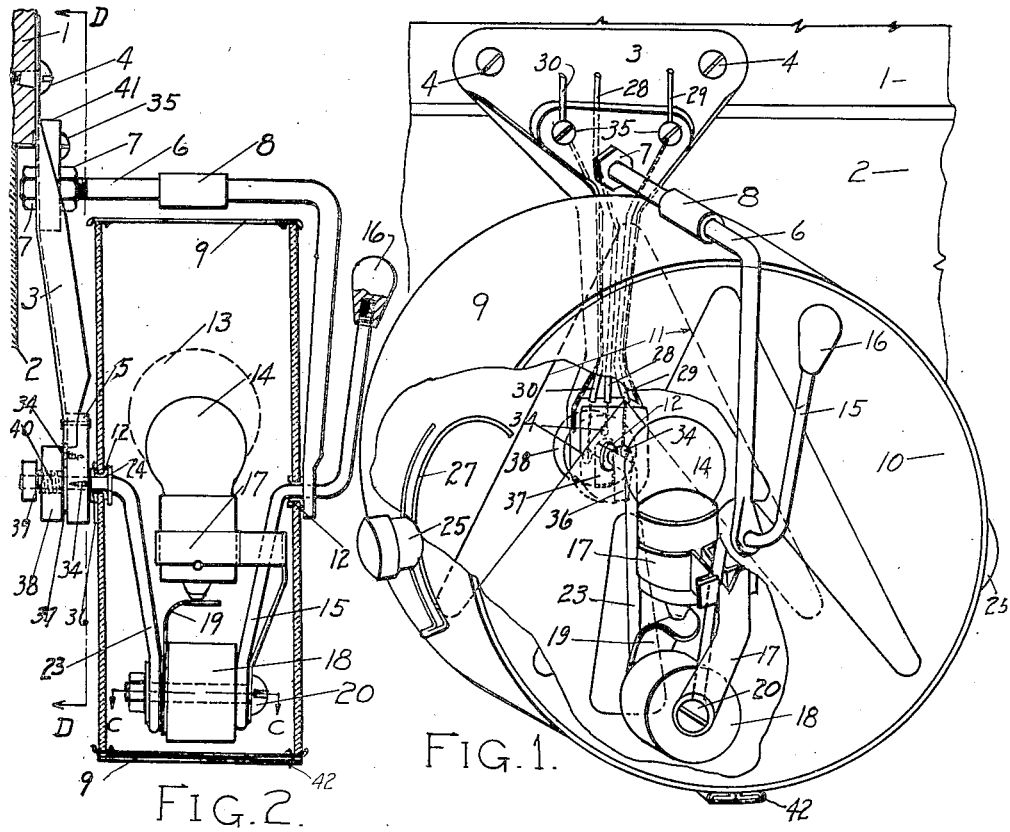
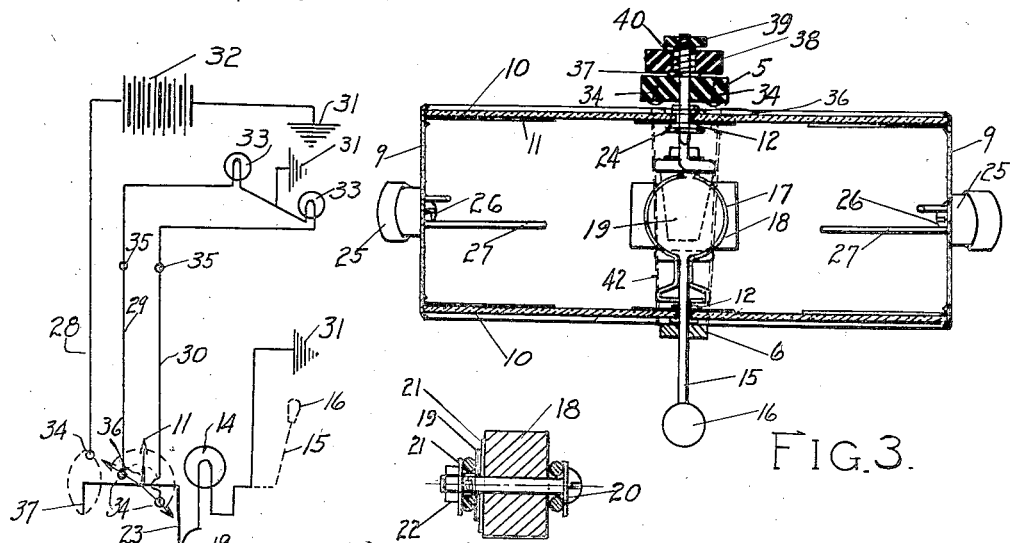
INVENTOR
Roy C. Blackman
WITNESSES:
Robert Blackman
Ralph L. Wagar March 16, 1937. R. C. BLACKMAN 2,074,011
AUTOMOBILE DIRECTION SWITCH AND SIGNAL
Filed Jan. 30, 1933 2 Sheets-Sheet 2
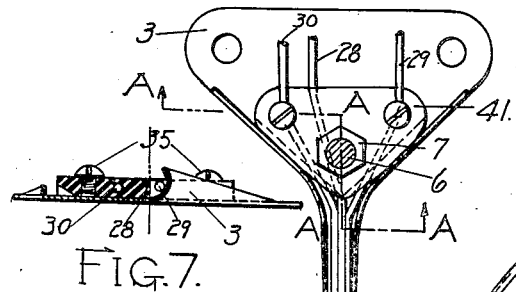
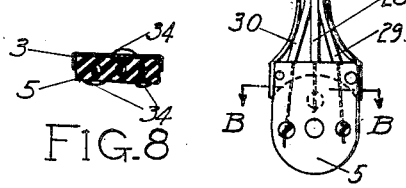
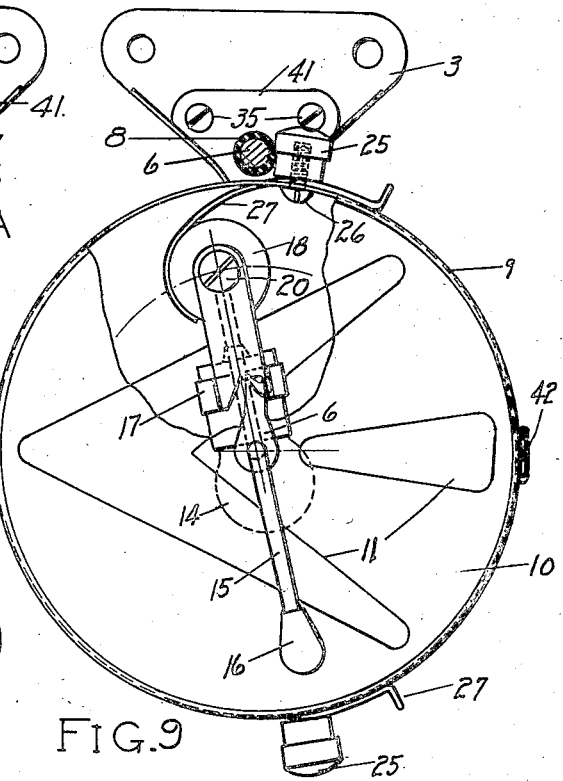
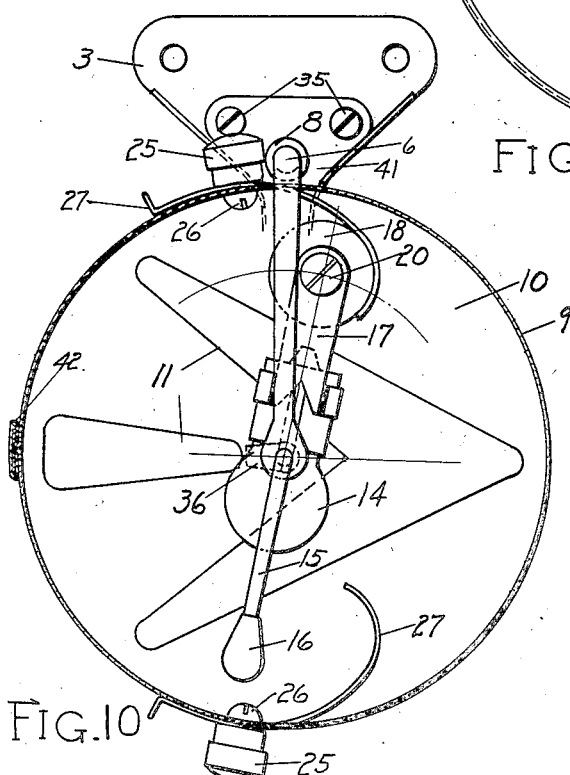
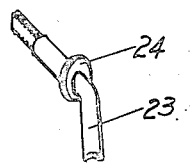
INVENTOR
Roy C. Blackman Patented Mar. 16, 1937

2,074,011

UNITED STATES PATENT OFFICE 2,074,011

AUTOMOBILE DIRECTION SWITCH AND SIGNAL

Roy C. Blackman, Cleveland, Ohio

Application January 30, 1933, Serial No. 654,273

4 Claims. (Cl. 177—327)

This invention relates to improvements in signal devices for automobiles and particularly to an improved semi-automatic switch and indicator operated manually and interrupted by the force of inertia on the counterweight crank at the time of making a turn.

The object of the invention is to provide an improved semi-automatic device so constructed that it will indicate the direction in which the driver intends to turn his car. It has for its object the provision of an electrical signal for this purpose which has a minimum of parts, simple and compact in construction and can be used to operate additional electrical signals if so desired.

The invention is clearly defined and pointed out in the claims.

An apparatus constituting a preferred embodiment of my invention is illustrated in the accompanying drawings forming a part of this specification, in which:

Fig. 1 is a fragmentary isometric view of the signal light attached to the car at the top of the windshield frame, with a portion broken away to show the interior of the housing.

Fig. 2 is a sectional elevation on center line showing connection to windshield frame of the car.

Fig. 3 is a sectional plan taken on center line.

Fig. 4 is a cross section through counterweight in line C—C on Fig. 2.

Fig 5 is an electrical wiring diagram.

Fig. 6 is a vertical cross section through Fig. 2 taken on line D—D, showing elevation on front supporting arm with wire connections.

Fig. 7 is a cross section through Fig. 6 taken on line A—A—A—A.

Fig. 8 is a cross section through Fig. 6 taken on line B—B showing wire terminals.

Fig. 9 is an elevation looking from the driver's side, with a portion of the near face broken away, showing the counterweight against the stop and the position of the arrow for a left turn.

Fig. 10 is an elevation looking from the driver's side with near arrow face removed, showing the indicating arrow set for a right turn.

Fig. 11 shows the insulating spring cover with switch arm.

Fig. 12 is a fragmentary perspective view of the end of the crank member, showing the end of the shaft for turning the switch arm.

Similar reference characters refer to similar parts throughout the several views of the drawings.

The direction driving signal consists of a rigid bracket attached to the upper windshield frame inside of the car window to support the mechanism, a counterweight crank with an electric light bulb automatically operated by gravity and inertia, and a balanced rotating housing formed from an outer rim and two face members with arrow shaped translucent openings.

The bracket consisting of the front member 3 is constructed of pressed metal with the arm portion shaped at the center to partly enclose the wires leading to the switch portion 5, and the top portion is flared and provided with holes to receive member 6 and fasten to the car body with screws 4 forming ground connection 31. Riveted to member 3 is block 5 serving as an insulating bearing for counterweight crank arm 23 and as a terminal block for the power line 28 from the car battery 32 and terminals for wires 29 and 30. The metal angle shaped round rod 6 threaded and securely clamped by nuts 7, forms the other part of the bracket which is provided with a rubber bumper 8 to receive stop buttons 25 and a bearing at the lower end to receive crank member 15.

What is referred to as a counterweight crank consists of a heavy metal cylindrical counterweight 18 with a hole in the center thereof to take a bolt 20 which shall be used to clamp the following members together in a rigid manner: a lamp holder shaped to form a socket to take an incandescent lamp; a crank member 15 shaped to support the counterweight and with projecting extension opposite to the counterweight to form an operating lever; an opposite crank member 23 similar to 15 but with a switch arm 37 in place of an operating arm and used to conduct electric current to the lamp in addition to forming an oscillating center for the counterweight crank, and together with spring contact member 19, this crank arm is entirely insulated from the remaining members of the counterweight crank. This crank is supported and free to oscillate, for more than a full revolution, in the insulated bearing 5 on arm 3 and in the metallic bearing of arm 6 of the supporting bracket.

The housing consisting of a shell 9 and two disks 10 with indicating arrow shaped faces 11, are rigidly secured so that they travel together and have the arrows point in the same direction. The housing is concentrically mounted on said counterweight crank center and provided with stops 25 which encounter the bracket 6 and limit the rotation of the housing to (180 degrees) a half revolution, which in turn stops the arrows to indicate either a right or left direction turn. Ample clearance in this housing allows for using various sizes of bulbs, as shown by dotted line 13 in Fig. 2. The outer shell 9 has the edges rolled inward to hold the two disks in position and is provided with holes for adjustable stops 27 and bolts 26. The shell is securely clamped in place by an outward reverse bend on each end of the shell with a slight taper to produce a binding effect upon the end disks 10 when a strip 42 shaped to form a double hook is slid on said beveled edges parallel to the axis of rotation as clearly shown in Fig. 3 and Fig. 10. The disks can be made of a metal or fibre material with an arrow shaped opening and backed by a translucent material such as celluloid; however with a metal disk the front face, where distributing arm 36 is applied, must be insulated. A preferable arrangement is an entire celluloid disk with a tubular rivet 12 at the center, which secures distributing arm 36 and provides a metal bearing. The desired arrow effect may be obtained by an arrow shaped of opaque insulating material and secured to the inside of the celluloid disk 10.

The housing is slightly weighted by strip 42 at a position adjacent to the tail of the arrow indications so that they are normally held in a vertical position by the action of gravity, the external stops are located on opposite sides of the arrows and limit the rotation of the housing to 90 degrees in either clockwise or counter-clockwise direction, the internal stops 27 engage the counterweight and cooperate with the external stops to limit the rotation of the counterweight to slightly over 180 degrees in either a clockwise or counter-clockwise direction so that the counterweight holds the signal housing in operative signalling position by the action of gravity on the counterweight.

The crank member 15 is made of a round bar bent to form a half crank with an outward projecting arm beyond the center of the bearing portion and extending outside of the housing with the finished knob 16 to form a lever for operating the signal. The opposite end of member 15 is provided with a loop to take the clamping bolt through the counterweight. The opposite crank member 23 is provided with a larger loop for the clamping bolt, to allow for insulating sleeve 22 and insulating washers 21 as shown in Fig. 4, which form insulating means when secured by bolt 20 through counterweight 18 making a rigid counterweight crank. The outer end of the bearing portion of said member is shaped as in Fig. 12 to drive a switch arm 37 shown in Fig. 11 and threaded to take a nut 39 at the end thereof, which presses against spring 40 enclosed by insulating cover 38 and against distributing lever 37 and producing a slight pressure for the contact levers 36 and 37 against the respective contact terminals 34; this spring thrust being resisted by collar 24 rigidly attached to counterweight arm 23.

A lamp holder 17 made of a formed metal strip cut and shaped to engage the counterweight crank member 15 and to conform to the shell of the incandescent lamp 14 is provided. The edge of the lamp holder toward the counterweight is provided with grooves to receive the projecting pins on the standard lamp shell, and with the downward projecting arm of the holder which is secured in position by clamp bolt 20 through counterweight 18. A spring contact member 19 to engage the lower terminal on the lamp bulb is shaped to produce a thrusting pressure against a standard single contact lamp, and holds the lamp in a rigid position.

The adjustable stop 27 mounted on the rim of the housing on opposite sides of the arrows is a U-shaped wire shaped to conform to the shell with the end outside the housing turned out to allow for ease of adjustment, and with the other end inside the housing hooked to receive the counterweight, limiting and stopping the motion thereof. Stop 27 passes through the outer shell, using the same holes as screws 26, and can be securely clamped by stop button 25 and screws 26. The neck of bolt 26, where passing through the outer shell 9, is flattened on opposite sides to be in contact with the two wires of the adjustable stop 27, to prevent bolt 26 from turning when adjusting stop button 25.

In Fig. 5 switch arm 37 in making contact with terminal 34 makes a rotation of slightly over 360 degrees, whereas the distributing arm 36 being limited to a total travel of 180 degrees is revolved only from the position in which the counterweight engages the stop hook 27, revolving the housing with contact arm 36 to contact terminal point 34. Power line 28 is terminated at contact screw 34 on the outside of insulating block 5 and in the plane of travel of switch arm 37 which is in contact with 34 only when operating lever has been operated. The wires 29 and 30 terminate at contact points 34 on the inside face of insulating block 5 which are in the plane of travel of distributing arm 36 which is in contact with one of said terminals depending on the position of the indicating arrow. The insulating block 41 which is clamped between nuts 7 against front member 3 provides a clamping means for removable connections for wires 29 and 30 to connect to additional signals, by means of screws 35.

The movement of the counterweight crank causes switch arm 37 to contact with terminal 34 and transmit the current to the lamp, through its lower contact point, by means of the crank arm 23 and spring contact member 19 both of which are insulated from the housing and brackets by means of the fibre terminal bearing block 5 on arm 3 and by fibre washers 21 and sleeve 22 shown on Fig. 4.

The normal position is with the counterweight inside the housing in its lowest position as shown in Fig. 1 and Fig. 2 at which time the switch 37 forms an open circuit. The said switch lever extends in the same direction as the counterweight and being driven by the crank member 23 is always traveling with the counterweight and therefore is only in contact with the terminal point 34 from an incoming power line 28 when the switch lever 37 is in an upright position or when operating lever is down in either a right or left indicating position and therefore incandescent bulb 14 and arrow faces 11 are only illuminated when the operating lever is turned down. The operating lever always returns to an upright position by the action of gravity on the counterweight 18 after the action of inertia at the time of making a curve.

When making a right turn the driver rotates the operating lever 15 with enlarged knob 16 in a right-hand or clockwise direction far enough to allow the center of gravity of the counterweight 18 to pass beyond the vertical line through the axis of rotation, carrying with it the revolving housing 9 and faces 10. The housing stops with its button 25 against the bracket member 6, provided with the rubber tube 8 to serve as a bumper, and indicating a corresponding direction with the arrows 11 on faces 10. The counterweight stops against an adjustable stop 27 inside of the housing and comes to rest in a position beyond the vertical line through the axis of rotation, thus causing a pressure by gravity tending to hold the housing and counterweight crank in this position, as clearly shown by Fig. 10.

The adjustment of the counterweight stop 27 by means of stop button 25 can be accomplished at any time from the outside of the housing, allowing for the variation of the effective center line of gravity due to the various crowns of the road. The counterweight 18 remains against stop 27 as long as the car continues on a straight course, and the inertia when making this turn removes the counterweight from its stop and forces it back past the vertical line through the axis of rotation, allowing gravity to return the counterweight 18 to its lowest position, and the hand lever to its normal high position with the lamp disconnected. The reverse turn is the same except for the rotation of the lever in a left-hand or counter-clockwise direction to indicate a left turn as clearly shown in Fig. 9.

It is the intention to use this signal without the auxiliary signals 33 using only one wire and the single bulb inside of the housing to produce the entire signal, thus eliminating the wires, connections and contact terminals with distributing arm 36. When used with a sedan body the signal can be seen from all sides, whereas, with a truck or delivery body it would be necessary to use the auxiliary signal unless it would be suitable to mount the signal in a location clearly seen from the rear; however the auxiliary signals can be used, if so desired, on any automobile.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. A direction signal and switch for vehicles embodying a frame to support and anchor the device, a signal casing pivotally supported by said frame, the forward and rearward faces thereof provided with arrow shaped indications normally held in an upright position by slightly weighting the signal casing at a position adjacent to the tail of the arrow indications, so that they are normally held in a vertical position by the action of gravity, an eccentric mass pivoted within said signal having a hand lever to actuate the mass extending outside of the casing, stops on opposite sides of the arrows projecting outwardly from the signal casing adapted to engage a part of the frame, to limit the rotation of the casing to 90 degrees in either clockwise or counter-clockwise direction, adjustable stops projecting within the signal casing in line with the path of travel of the mass and cooperating with the outward stops to limit rotation of the mass to slightly over 180 degrees in either a counter-clockwise or a clockwise direction whereby the mass is held by gravity against the stops to hold the signal casing in operative signaling position, whereby at the time of making the indicated turn, inertia will exert a force opposite to the thrust of the counterweight against the stop, thus releasing the aforesaid signal to allow gravity to return the signal to a normal position.

2. A direction signal and switch for vehicles embodying a supporting frame, a signal housing pivoted therefrom having arrow shaped indication faces, said housing being weighted at a position adjacent to the tail of the arrows so that the action of gravity will normally position the arrows in a vertical position, a mass pivoted within said signal normally suspended in a low position; stops on opposite sides of the arrows outside of the housing adapted to engage the frame at 90 degrees rotation to a right or left direction indication and stops to cooperate with the external stops adjustably secured within the signal housing adjacent to the external stops projecting in the path of travel of the mass within the housing, a means for manually operating the mass to an elevated position through a rotation of slightly over 180 degrees in either a counter-clockwise or clockwise direction from the normal position said mass being sustained by the stops and gravity in a right or left position producing an advanced signal for a desired turn, an electric switch comprising an insulated terminal mounted on the frame, connected to one terminal of a source of current, the other terminal of which is grounded, a switch contact member mounted for movement with the mass and positioned so as to engage the terminal when the mass is in an elevated position to give a signal, an electric lamp carried by the mass and having one terminal grounded, the other terminal being connected to the contact member.

3. A direction signal and switch for vehicles embodying a frame to support and anchor the device, a signal proper comprising a front and rear arrow face with outer rim forming a drum shaped housing slightly counterweighted at a position adjacent to the tail of the arrow indications so that they pivot on said frame and normally take an upright position by the action of gravity, a mass pivoted within said housing supported from the frame and normally in its lowest position by the action of gravity, an electric illuminating means supported by the mass within the housing, stops projecting from the exterior of the housing located on opposite sides of the arrows and adapted to encounter a part of the frame of the signal and limit the rotation of the housing in a clockwise or counter-clockwise direction, and stops adjustably extending into the housing on opposite sides of the arrows to receive the mass within the signal and cooperate with the external stops to limit the rotation of the mass to slightly over 180 degrees in either a clockwise or counter-clockwise direction whereby gravity holds the signal and mass in an operative position, and means for automatically illuminating the lamp when the mass is moved to an upright position.

4. In a device of the described class the combination of a frame consisting of a vertical member securely anchored to a vehicle at its upper end, the lower end provided with an insulated bearing block with electric switch or contact terminals and an opposite metal bearing removably connected to the vertical member above the signal to serve as a stop, a crank shaft pivotally supported at its ends from said frame, consists of two opposite crank members of metal, insulated and rigidly connected to a counterweight having an electric bulb and socket electrically connected to the opposite crank members, manually actuated means for revolving said crank about its pivoted support, an electric contact arm carried by the crank shaft to contact a terminal on the outer side of the insulated bearing block, wired to supply electric current from the car battery, and engaged by the contact arm when the crank shaft is rotated through slightly more than a half revolution in either direction from a normal position with the counterweight hanging down; a housing with arrow shaped translucent openings on the front and rear faces enclosing the counterweight, said housing being rotatably mounted on said frame, weighted at a position adjacent to the tail of the arrows so as to normally have the arrows point upwards by the action of gravity, stop members projecting from said housing on opposite sides of the arrows and stopping against the aforesaid frame, to limit the travel of the housing to 180 degrees, a distributing arm electrically connected to the crank shaft attached to the front face of the housing and projecting toward the tail of the arrow carried by said housing adapted to engage either of two opposite contact terminals on the inner side of the insulating block at a 90 degree rotation of the housing in either a counter-clockwise or clockwise rotation to distribute the current to additional signals, adjustable stop means projecting within the housing on opposite sides of the arrow indications, means for adjustably positioning said stop means, said stop means cooperating with the first mentioned stop members to limit rotation of the crank member to slightly over 180 degrees in either direction.

ROY C. BLACKMAN.